United States Patent Office 3,597,236
Patented Aug. 3, 1971

3,597,236
PROCESS FOR PRESERVING THE COLOR OF FRESH MEAT
Ervin W. Hopkins, Hinsdale, and Kunito Sato, Chicago, Ill., assignors to Armour and Company, Chicago, Ill.
No Drawing. Filed Aug. 8, 1967, Ser. No. 659,011
Int. Cl. A23b 1/00
U.S. Cl. 99—157                                             6 Claims

ABSTRACT OF THE DISCLOSURE

An agent for preserving the color of meat comprising ascorbic acid and a chemical selected from the group consisting of para-aminobenzoic acid, meta-aminobenzoic acid, isonicotinic acid and N-ethylnicotinamide.

BACKGROUND OF THE INVENTION

This invention relates to a process and agent for treating meat to obtain a more desirable meat color.

Myoglobin, hemoglobin and other like compounds found in meat are commonly believed to be responsible for the red and red-purple color of fresh meat. Upon exposure to air these compounds, hereinafter referred to as pigments, are oxidized to oxymyoglobin and oxyhemoglobin which are bright red in color. Exposure to air over prolonged periods results in a further oxidation to metmyoglobin and methemoglobin which are brown or grey in color and which detract from the appearance and saleability of the meat.

Conventional meat-color preserving agents, such as ascorbic acid and/or nicotinic acid, function by reacting with the pigments either before or after they are oxidized. Nicotinic acid reacts with myoglobin and hemoglobin before being oxidized and forms a bright red compound that is relatively color stable and resistant to oxidation over a period of time. Ascorbic acid functions by reducing metmyoglobin and methemoglobin, which are brown or grey in color, to myoglobin and hemoglobin which react with oxygen upon exposure to air to form oxymyoglobin and oxyhemoglobin which are bright red in color. Continued exposure to the air, however, will cause an oxidation of the reaction product of nicotinic acid and myoglobin and hemoglobin, and of oxymyoglobin and oxyhemoglobin with a resultant change of color in the meat to brown or grey.

It will be noted that ascorbic acid performs its function by reacting with the meat pigments in their oxidized state and that the nicotinic acid performs its function by reacting with the meat pigments in their reduced state. In searching for new meat-color preservatives, the existing art has proceeded on the assumption that any new color preservative must also possess the ability to react with oxidized or reduced pigments. This has limited the field of search for new preservatives as demonstrated by the relatively few color preserving agents known in the art such as those disclosed by U.S. Pats. Nos. 2,491,646; 2,541,572; and 2,863,777. Furthermore, nicotinic acid has been known to cause vasodilation and care must be exercised to be sure that this chemical is used in relatively small amounts to avoid this reaction.

SUMMARY OF THE INVENTION

It is therefore an object of the present invention to provide a new meat-color preserving agent. Other objects and advantages will become apparent as the specification proceeds.

It has been discovered that the red-purple and red color of fresh meat are preserved for long periods of time when the meat is contacted with ascorbic acid and certain chemicals which do not appear to react with myoglobin, hemoglobin or other like compounds commonly believed to be responsible for the color of meat. The chemicals which have been found to possess this property are selected from the class of nitrogen bearing cyclic compounds substituted with a carboxyl group which consist of para-aminobenzoic acid, meta-aminobenzoic acid, isonicotinic acid, and N-ethylnicotinamide, hereinafter referred to as the cyclic compounds.

It is not known if these cyclic compounds enter into any reaction but it is believed that they do. The identity of the other reactants and of any reaction product is unknown, however, and no explanation for this phenomenon can be offered except that the color of meat is preserved when the meat is in contact with any one of these cyclic compounds and ascorbic acid. Some of the cyclic compounds have some color preserving ability when used alone but the combination of ascorbic acid with any one of the cyclic compounds preserves the color of meat for considerable longer periods of time than either ascorbic acid or any one of the cyclic compounds when used individually.

Treatment of whole meat, such as cuts of meat or whole carcasses, may be accomplished by dusting the exposed surfaces with one of the cyclic compounds and ascorbic acid or by spraying the surfaces with a solution thereof. For carcasses, treatment may be accomplished by injecting a solution of the treating materials into the arteries and veins. For ground meat, the treating materials may be applied to the exposed surface of the ground meat or added to the meat before or during grinding to permit distribution thereof throughout the ground mass. It is preferred that the cyclic compound and ascorbic acid be uniformly mixed together before being applied to insure proper distribution but the invention is not limited thereto and comprehends the separate application of each treating material.

The quantities of treating materials required will vary according to the form of the meat being treated and the rate of distribution throughout the meat mass. When the treating substances are incorporated in ground meat, satisfactory results have been obtained by employing ascorbic acid in the amount of 100 mg. per pound of meat and the cyclic compound in amounts of 50, 100, 200, and 400 mg. per pound of meat. Good results are also obtained by employing ascorbic acid in amounts from about 25 to about 200 mg. per pound of meat and the cyclic compound in amounts from about 50 to about 600 mg. per pound of meat.

The aforesaid amounts and ranges of ascorbic acid and the cyclic compound also give satisfactory results if these materials were injected into the whole meat.

When the treating substances are dusted or sprayed on the surface of the meat, satisfactory results have been obtained by employing one part of ascorbic acid to one-half, one, two, or four parts of the cyclic compound but any ratio from about one to eight parts of ascorbic acid to about two to sixteen parts of the cyclic compound also give good results.

It will be understood, however, that where difficulties of distribution are present, greater quantities of the treating materials may be required to effect a good result.

The time required to effect the treatment will also vary due to the different forms of meat which may be treated with results in different rates of diffusion. When the meat is ground and rapid diffusion is possible, the treatment may be effected within a few hours. For meat cuts and whole carcasses, several days may be required for effective treatment except when effective means of diffusion are provided.

The use of this new meat-color preserving agent finds its greatest utility in preserving the color of fresh meats but its use is not limited thereby as it may also be used to improve the color of aged and cured meats.

EMBODIMENT OF THE INVENTION.—EXAMPLE I

Five two-pound batches of ground meat comprising 80% of beef chuck and 20% of kidney fat were made up and four of the batches were mixed with an additive having the following formulation for each two pound batch of meat:

Cyclic compound—800 mg.
Ascorbic acid—200 mg.
Dextrose (carrier)—4.5 g.

Each batch contained one of the four cyclic compounds disclosed by the instant invention. The fifth batch contained no additives and was used as the control batch for purposes of comparison with the other four.

The dextrose in the aforesaid formulations has been employed as a carrier to provide a more uniform distribution in and on the meat of the meat preserving agents. Any other substance such as salt, starch or the like which will serve this function and not have an adverse effect upon the meat or its color could be used as well. The concentration of the carrier used in all of the examples has been 4.5 g. per two pounds of meat but any other suitable concentration can be used.

Sodium bicarbonate was added to each of the batches having an acid cyclic compound and in an amount to neutralize the acid so the pH of the meat would not be changed.

Each of the batches were formed into one pound loaves and wrapped with a conventional fresh meat cellophane and held in a refrigerated room at 40° F. The color on the outside of the meat loaves was then observed at the time the loaves were initially wrapped and at various intervals thereafter. The color changes are tabulated as follows:

| Additive | Color description after— | | | | |
|---|---|---|---|---|---|
| | Initial | 16 hours | 24 hours | 40 hours | 64 hours |
| 1. p-Aminobenzoic acid and ascorbic acid | Red | Red | Red-bright red | Bright red | Bright red. |
| 2. M-aminobenzoic acid and ascorbic acid | Red | Red | do | do | Do. |
| 3. Isoniotinic acid and ascorbic acid | Bright red | Red | Bright red | do | Do. |
| 4. N-ethylnicotniamide and ascorbic acid | do | Bright red | do | do | Dark red, some brown. |
| 5. Control | Red | Red | Dark red | Dark red | Brown |

EXAMPLE II

Six two pounds batches of meat were made up as described in Example I. Three of these batches were mixed with 200 mg. of ascorbic acid and varying amounts of para-aminobenzoic acid. The fourth batch contained no additives and was used as the control batch. The fifth batch was mixed with 200 mg. of ascorbic acid, and the sixth batch was mixed with 200 mg. of para-aminobenzoic acid.

Each of the batches were then formed into one pound loaves, wrapped with cellophane, and observed for color changes as described in Example I. The color changes are tabulated hereinbelow:

| Additive | Color description after— | | | |
|---|---|---|---|---|
| | 18 hours | 42 hours | 68 hours | 85 hours |
| 1. para-Aminobenzoic acid (200 mg./lb.) and ascorbic acid | Bright red | Bright red | Dark red | Purple-red. |
| 2. para-Aminobenzoic acid (100 mg./lb.) and ascorbic acid | Red | Dark red | Brown-red | Do. |
| 3. para-Aminobenzoic acid (50 mg./lb.) and ascorbic acid | Red | Brown-red | do | Do. |
| 4. Control | Purple-red | Brown | Purple-brown | Brown. |
| 5. Ascorbic acid | Bright red | Slight red-brown | do | Do. |
| 6. para-Aminobenzoic acid | Purple-red | Brown-red | Brown-red | Do. |

EXAMPLE III

Six two pound batches of meat were made up and additives were mixed therewith in three of the batches as described in Example II except for the substitution of meta-aminobenzoic acid for para-aminobenzoic acid. The fourth batch served as the control. The fifth batch was mixed with 200 mg. of ascorbic acid and the sixth batch was mixed with 200 mg. of meta-aminobenzoic acid.

The batches were also prepared for the observation of color changes as described in Example II and the color changes are tabulated hereinbelow:

| Additive | Color description after— | | |
|---|---|---|---|
| | 18 hours | 42 hours | 68 hours |
| 1. m-Aminobenzoic acid (200 mg./lb.) and ascorbic acid | Bright red | Red | Dark red. |
| 2. m-Aminobenzoic acid (100 mg./lb.) and ascorbic acid | do | Red | Brown-red. |
| 3. m-Aminobenzoic acid (50 mg./lb.) and ascorbic acid | do | Dark red | Do. |
| 4. Control | Dark red | Brown-red | Brown. |
| 5. Ascorbic acid | do | Dark red | Brown-red. |
| 6. meta-Aminobenzoic acid | do | Brown-red | Brown. |

EXAMPLE IV

Six two pound batches of meat were made up and additives were mixed therewith in three of the batches as described in Example III except for the substitution of isonicotinic acid for meta-aminobenzoic acid. The fourth batch served as the control. The fifth batch was mixed with 200 mg. of ascorbic acid and the sixth batch was mixed with 200 mg. of isonicotinic acid.

The batches were also prepared for the observation of color changes as described in Example III and the color changes are tabulated hereinbelow:

| Additive | Color description after— | | |
|---|---|---|---|
| | 18 hours | 42 hours | 68 hours |
| 1. Isonicotinic acid (200 mg./lb.) and ascorbic acid | Bright red | Bright red | Brown-red. |
| 2. Isonicotinic acid (100 mg./lb.) and ascorbic acid | do | do | Brown. |
| 3. Isonicotinic acid (50 mg./lb.) and ascorbic acid | do | Dark red | Do. |
| 4. Control | Brown-red | Brown | Do. |
| 5. Ascorbic acid | Dark red | Brown-red | Do. |
| 6. Isonicotinic acid | Brown-red | Brown | Do. |

EXAMPLE V

Six two-pound batches of meat were made up and additives were mixed therewith in three of the batches as described in Example IV except for the substitution of N-ethylnicotinamide for isonicotinic acid. The fourth batch served as the control. The fifth batch was mixed with 200 mg. of ascorbic acid and the sixth batch was mixed with 200 mg. of N-ethylnicotinamide.

The batches were also prepared for the observation of color changes as described in Example IV and the color changes are tabulated hereinbelow:

| Additive | Color description after— | | |
|---|---|---|---|
| | 18 hours | 42 hours | 76 hours |
| 1. N-ethylnicotinamide (200 mg./lb.) and ascorbic acid. | Bright red | Bright red | Bright red. |
| 2. N-ethylnicotinamide (100 mg./lb.) and ascorbic acid. | do | do | Do. |
| 3. N-ethylnicotinamide (50 mg./lb.) and ascorbic acid. | do | do | Red. |
| 4. Control | Red | Dark red | Brown-red. |
| 5. Ascorbic acid | Red | do | Do. |
| 6. N-ethylnicotinamide | Dark red | do | Dark red. |

An analysis of the color changes in Example I shows the red color of the control batch beginning to darken after 24 hours and turning brown at 64 hours. The red color of the batches containing ascorbic acid and each of the cyclic compounds at concentrations of 400 mg. per pound became brighter after 24, 40 and 64 hours with the one exception of the N-ethylnicotinamide-ascorbic acid which was dark red with some brown at 64 hours.

When ascorbic acid is used with varying concentrations of the cyclic compounds in Examples II through V, the color of the batches containing these additives were generally all preserved for longer periods than the control batch and the batches containing one of the cyclic compounds and ascorbic acid individually even when as little as 50 mg. per pound of the cyclic compound was used with the ascorbic acid.

In the foregoing examples predetermined amounts of the meat-color preserving additives have been mixed with predetermined amounts of ground meat, these specific amounts and the method of application were for control purposes only and are not to be taken as limitations of the instant invention which comprehends contacting fresh meat with any suitable amount of the color preserving agent of the instant invention.

What is claimed is:

1. In a process for preserving the color of fresh meat, the step of contacting said meat with a meat-color preserving agent comprising about one to eight parts of ascorbic acid and about two to sixteen parts of a cyclic compound selected from the group consisting of:

(a) para-aminobenzoic, and
(b) meta-aminobenzoic acid.

2. The process as set forth in claim 1 wherein said agent has a carrier incorporated therein selected from the group consisting of dextrose, salt and starch.

3. The process as set forth in claim 1 wherein said cyclic compound is para-aminobenzoic acid.

4. The process as set forth in claim 1 wherein said cyclic compound is meta-aminobenzoic acid.

5. The process as set forth in claim 1 wherein the concentration of ascorbic acid is about 25 to about 200 mg. per pound of meat and the concentration of said cyclic compound is about 50 to about 600 mg. per pound of meat.

6. The process as set forth in claim 1 wherein the concentration of ascorbic acid is about 100 mg. per pound of meat and the concentration of said cyclic compound is about 400 mg. per pound of meat.

References Cited

UNITED STATES PATENTS

| | | | |
|---|---|---|---|
| 2,377,029 | 5/1945 | Norris | 99—163 |
| 2,432,698 | 12/1947 | Taub et al. | 99—163X |
| 2,491,646 | 12/1949 | Coleman et al. | 99—107 |
| 2,707,154 | 4/1955 | Lehmann et al. | 99—163 |
| 3,095,306 | 6/1963 | Peat | 99—150X |

HYMAN LORD, Primary Examiner

U.S. Cl. X.R.

99—107